US00RE37550E

(19) United States

(12) Reissued Patent

Chambers, Sr., deceased et al.

(10) Patent Number: US RE37,550 E

(45) Date of Reissued Patent: Feb. 19, 2002

(54) SOLID WASTE COMMINUTOR WITH REMOVABLE BEARING ASSEMBLY AND IMPROVED SIDE RAILS

(75) Inventors: Joseph W. Chambers, Sr., *deceased*, late of Huntington Beach, by Jane McKinley, Gregory Jordan, legal representatives; Robert T. Sabol, Aliso Viejo; Craig J. Fennessy, Huntington Beach; Rodney E. Graham, Tustin, all of CA (US)

(73) Assignee: Disposable Waste Systems, Inc., Santa Ana, CA (US)

(21) Appl. No.: 09/228,682

(22) Filed: Jan. 12, 1999

Related U.S. Patent Documents

Reissue of:

(64) Patent No.: 5,593,100
Issued: Jan. 14, 1997
Appl. No.: 08/567,046
Filed: Dec. 4, 1995

U.S. Applications:

(63) Continuation-in-part of application No. 08/275,724, filed on Jul. 19, 1994, now Pat. No. 5,478,020, which is a continuation of application No. 08/077,106, filed on Jun. 16, 1993, now Pat. No. 5,354,004.

(51) Int. Cl.[7] ..... B02C 18/16

(52) U.S. Cl. ..... 241/101.2; 241/236

(58) Field of Search ..... 241/101.2, 235, 241/236, 242, 243; 384/144, 280, 282, 480, 489

(56) References Cited

U.S. PATENT DOCUMENTS 558,642 A * 4/1896 Fayol ..... 384/558
4,127,310 A * 11/1978 Werner ..... 384/149
4,702,422 A * 10/1987 Chambers, Sr. et al. 241/236 X
4,724,662 A * 2/1988 Glandenoto et al. .... 241/243 X
4,799,627 A * 1/1989 Potts ..... 241/236
4,961,540 A * 10/1990 Wiesemann ..... 241/236 X
4,982,907 A * 1/1991 Sedgwick et al. ..... 241/236
5,048,764 A * 9/1991 Flament ..... 241/236 X
5,096,499 A * 3/1992 Tilby et al. ..... 241/236 X
5,100,069 A * 3/1992 Barclay ..... 241/236
5,163,629 A * 11/1992 Raterman et al. ..... 241/236
5,207,392 A * 5/1993 Stangenberg ..... 241/236
5,261,750 A * 11/1993 Eckhardt et al. ..... 384/455

* cited by examiner

*Primary Examiner*—Timothy V. Eley

(74) *Attorney, Agent, or Firm*—Sughrue, Mion, Zinn, Macpeak & Seas, PLLC

(57) ABSTRACT

A solid waste material comminuting system having a electric motor for providing rotary motion, a pair of cutter stacks with cutter elements of one stack interleaved with cutter elements of the other, and gear means to transmit the rotary motion of the electric motor to counter-rotate cutter elements of one stack with cutter elements of the other. Each of the cutter stacks comprise a central shaft journaled for rotation and a bearing module at each end of the central shafts. Each bearing module comprises an end housing, and a pair of insertable preassembled bearing assemblies mountable in each of said end housings. One bearing assembly has a thru-hole for journaling a first shaft for rotation and a second bearing assembly has a thru-hole for journaling a second shaft for rotation. The housing has an inspection port at the top to allow for tightening of the cutter stack. The device employs side rails having interleaved and smooth portions to guide solids to the cutter stack and to accelerate the flow of fluid around the outside of the cutters.

30 Claims, 5 Drawing Sheets

SOLID WASTE COMMINUTOR WITH REMOVABLE BEARING ASSEMBLY AND IMPROVED SIDE RAILS

Matter enclosed in heavy brackets [ ] appears in the original patent but forms no part of this reissue specification; matter printed in italics indicates the additions made by reissue.

BACKGROUND OF INVENTION

1. Cross Reference to Other Applications

This invention is a continuation-in-part of application Ser. No. 08/275,724 filed Jul. 19, 1994, now U.S. Pat. No. 5,478,020, which in turn is a continuation of application Ser. No. 08/77,106, filed Jun. 16, 1993, now U.S. Pat. No. 5,354,004.

2. Prior Art

This invention relates to a solid waste communiting apparatus. Such devices have been established in the art and are now widely used in a variety of industrial applications, such as municipal waste treatment and industrial applications. Reference is made to U.S. Pat. No. 4,046,324, which discloses such a basic system that has achieved commercial success.

By definition, comminution is the reduction of particle size of solid waste material to minute particles. It is generally performed by shearing, shredding and crushing of the waste material. As set forth in the '324 patent, comminution occurs by utilizing a pair of counter-rotating intermeshed cutting members.

The solid waste material is fed into the interface between cutting elements, typically utilizing a fluid carrier medium and shearing action occurs because the two cutters overlap each other such that opposing forces of counter-rotation of the cutting elements on the different stacks act on the solid material as it passes through the device.

In practice, such devices are generally used in an influent/effluent path. That is, the solid material is generally entrained in a liquid and the device is placed directly in the liquid stream. By having the solid material entrained in a liquid stream transportation of the material to and from the unit occurs. Further, by softening the solid particles, a greater degree of comminution is achieved. Devices of the type disclosed in the '324 patent have found commercial success and are widely used in waste treatment facilities, shipboard use and the like. As can be appreciated, the environment of use is very harsh for the equipment and as such, routine maintenance is required in both a preventative sense and also to immediately repair breakdowns when they occur thus minimizing system down-time.

An important aspect of such maintenance and repair is the integrity of the seals which provide the cutter stacks to rotate while minimizing friction. Given the mass of the cutter stacks together with high motor torque, loads on the seals are large and thus seal integrity is a primary consideration. In the past, two-shafted machines such as the '324 device required that the seal assembly be an integral part of the device. Such is illustrated in FIG. 1 of the '324 patent. As a result, if there was a seal failure other critical components of the device were likely to be effected. This failure of a seal could thus mean that bearings could fail and seize up the cutter stack.

Importantly, to repair the seal assembly, in the prior art, there was a requirement that the device be disassembled and completely reassembled. In the context of a unit which is used in fluid waste treatment that down-time, in some cases as long as a day could have detrimental effects in the ability of a plant to process waste. Such would require rerouting solid waste, shutting down a portion of the facility and otherwise result in an inefficient operation.

Moreover, in prior art two-shafted machines, the cutter stack and the various seal components were integral and in-line with a fixed geometry. Consequently, tightening of the cutter stack, by compression, resulted in compression of the seals. Again, such is illustrated in FIG. 1 of the '324 patent. It has been recognized however, that under normal operating conditions the cutter thickness experiences wear and thus the overall thickness of the stack tends to reduce over time. The result is an effective reduction in the overall stack height and the stack therefore tends to become loose. As a consequence, initial compression of various seal components is lost and the seal faces tend to separate. The result is leakage across the seal with the subsequent result of bearing failure.

Another deficiency in the prior art was the use of a labyrinth between the main fluid chamber and the seal faces. The labyrinth was generally incorporated into the seal components as sacrificial component. Because such devices are used in applications which include a high grit content, the labyrinth tended to be a relatively high wear component. As a consequence, seal components had to be removed to replace the labyrinth with the potential for seal damage upon reassembly.

SUMMARY OF THE INVENTION

Given these deficiencies in the prior art, it is an object of this invention to provide an improved solid waste comminutor that overcomes the operational and assembly problems of prior devices in terms of access to components.

It is a further object of this invention to provide a solid waste comminutor which employs a cartridge with a balanced seal-bearing design to produce a constant seal face pressure.

A further object of this invention is to provide a solid waste comminutor of improved seal and bearing life by improved seal effectiveness which is independent of stack tightness.

Yet another object of this invention is to provide a seal cartridge for a solid waste comminutor which has an independent labyrinth that can be replaced without disassembly of the seal-bearing structure.

Another object of this invention is to provide an improved solid waste comminutor that utilizes an improved side rail assembly to direct flow through the comminutor.

A still further object of this invention is to provide an improved solid waste comminutor that employs an access port at the top of the cutter stack to permit stack tightening and a reduction in the size of the lower compartment to reduce head drop.

These and other objects of this invention are achieved by a dual stack solid waste comminutor having preassembled bearing-sealing elements that are replaceable individually.

That modular assembly improves system life while minimizing down-time. In accordance with this invention a cartridge type seal is employed utilizing two modular assemblies, one on each end of the cutter stack. Each of the modular bearing-seal assemblies comprises a pair of identical bearing-seal cartridges. Two identical bearing-seal cartridges are assembled into the end housing to thus form top and bottom modular pairs.

Further, in accordance with this invention the bearing-seal cartridges float within the housing to provide movement with shaft movement thereby reducing the stress on the shafts and bearings.

A quick exchange of the mechanical subassembly, which includes bearings, O-ring seals and cartridge housing itself can be effectuated. As a result of this modular assembly, an individual seal cartridge can be installed quickly without the need to disassemble the entire subassembly.

Another advantage of this technique is that the bearing-seal cartridge is identical for the top and bottom of the cutter stack. As a consequence, a deficiency in the prior art which used two different assemblies has been eliminated. The bearing-seal cartridge is an item which is preassembled and installed as received. Thus, there is no requirement that the individual items, the various races, bearings and the like be assembled at the job site. Rather, the cartridge is interchangeable as a unit and is inserted into the end housing.

Further, in accordance with this invention re-torquoring of the cutter stack can be accomplished while the unit is still in-channel and installed. This is accomplished by an access port located at the top of the cutter stack assembly. It has been demonstrated that in practice, the most common preventative maintenance function is re-torquing the cutter stack to maintain stack compression for maximum cutting efficiency.

Prior to this invention a loss of stack compressibility leads directly to premature seal and bearing failure, primarily of the bottom seal assembly. In accordance with this invention, the tightness of the seal assembly is independent of total stack height, since it is designed as a self contained unit no disassembly is required.

Another advantage of this invention is an early warning seal failure detection system which can be used to prevent premature bearing failure. The invention provides for a drain port and/or weep holes in the shafts that allow fluid permeating from the seal to escape to the exterior. This can thus be viewed by maintenance personnel during routine checks of the system.

Additionally, this invention uses an improved side rail system to both strengthen the device as well as direct flow around and toward the cutter elements. The side rails have a greater strength compared to normal unit side plates and thus provide additional stiffness for the device. The two side rails function to channel the flow at the input side of the device into the cutters. At the periphery of the cutter and on the downstream side, the side rails accelerate the flow to promote cleaning of the cutter elements.

These and other objects of this invention will become apparent by a review of the attached drawing and the description of the preferred embodiment which follows.

BRIEF DESCRIPTION OF THE DRAWING

FIGS. 3, 4 and 5 illustrate a second preferred embodiment in which, FIG. 3 is a schematic side view, FIG. 4 is a cut-away view illustrating the internal components and FIG. 5 is a perspective view of the side rail.

DESCRIPTION OF THE PREFERRED EMBODIMENTS

Figure 1:
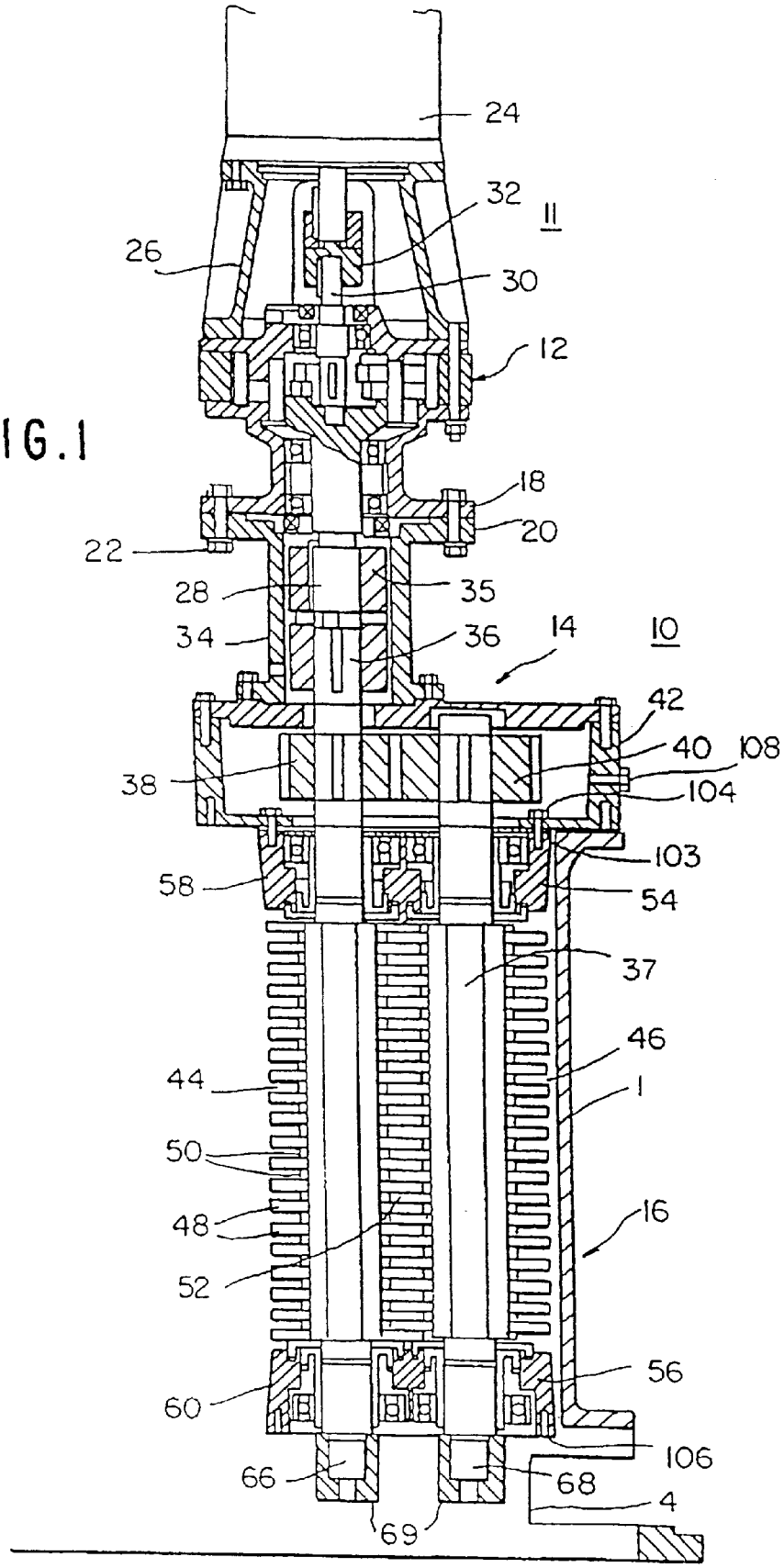
FIG. 1 is a cut-away side view of the overall comminution system of this invention in accordance with a first preferred embodiment.

Referring to FIG. 1, a cut-away side view of the overall system according to a first preferred embodiment is depicted. In FIG. 1 the housing 1 has an inlet and outlet, not illustrated. At the bottom of the housing, a pair of access cut-outs 4 are provided to permit stack tightening, to be described herein, without disassembly of the device. The unit employs, three essential subsystems, which comprise a complete comminution apparatus 10. These are a drive subsystem 11 with a motor 24 and speed reducer 12, a gearing subsystem 14, and a cutting subsystem 16. The housing 26 for the speed reducer 12 is mounted to the gear and cutter system 14, 16 by a pair of conforming flange elements 18, 20, which are clamped together by means of bolts 22. The motor is typically an electric drive motor 24, the details of which need not be discussed in detail. It will be recognized by those skilled that a suitable motor and drive system can be employed consistent with the scope of intended use. The speed reducer is contained in a housing 26 and employs an input shaft 30 and an output shaft 28. The input shaft 30 is journaled for rotation using a coupling 32 to the motor 24. This provides axial and radial alignment of the motor unit 24 with the speed reducer 12.

The output shaft 28 of the sped reducer 12 passes through a transition piece 34 in which the output shaft 28 is keyed to a drive shaft 36 of one cutter stack by means of a coupling 35. The drive shaft 36 carries a gear 38. The drive shaft 37 of the other cutter stack carries a gear 40. Both gears 38 and 40 are housed in housing 42 of the gear unit 14. The two gears provide counter-rotation to a pair of cutter stacks 44, 46. That is, shaft 36 is the drive shaft and shaft 37 is the driven shaft which counter-rotates due to gears 38, 40. Each of the cutter stacks 44, 46 comprises an alternating sequence of cutting elements 48 and spacers 50. As illustrated in FIG. 1, the interface is such that by beginning the stack 44 with a cutter element and stack 46 with a spacer element the cutter elements interleave with each other in the area between the two cutter stacks, which has been denoted by numeral 52. It is this interactive pair of stacks in zone 52 which provides the shredding of material as it passes through the cutter elements.

The cutter elements themselves may be either the same on each stack or differ from stack to stack. For example, it has been found that having eleven teeth on one cutter element and five on the opposing element improves the clean-out efficiency of the unit. Moreover, the geometry of the cutter elements may also be different in addition to the variations in the number of teeth.

Figure 2:
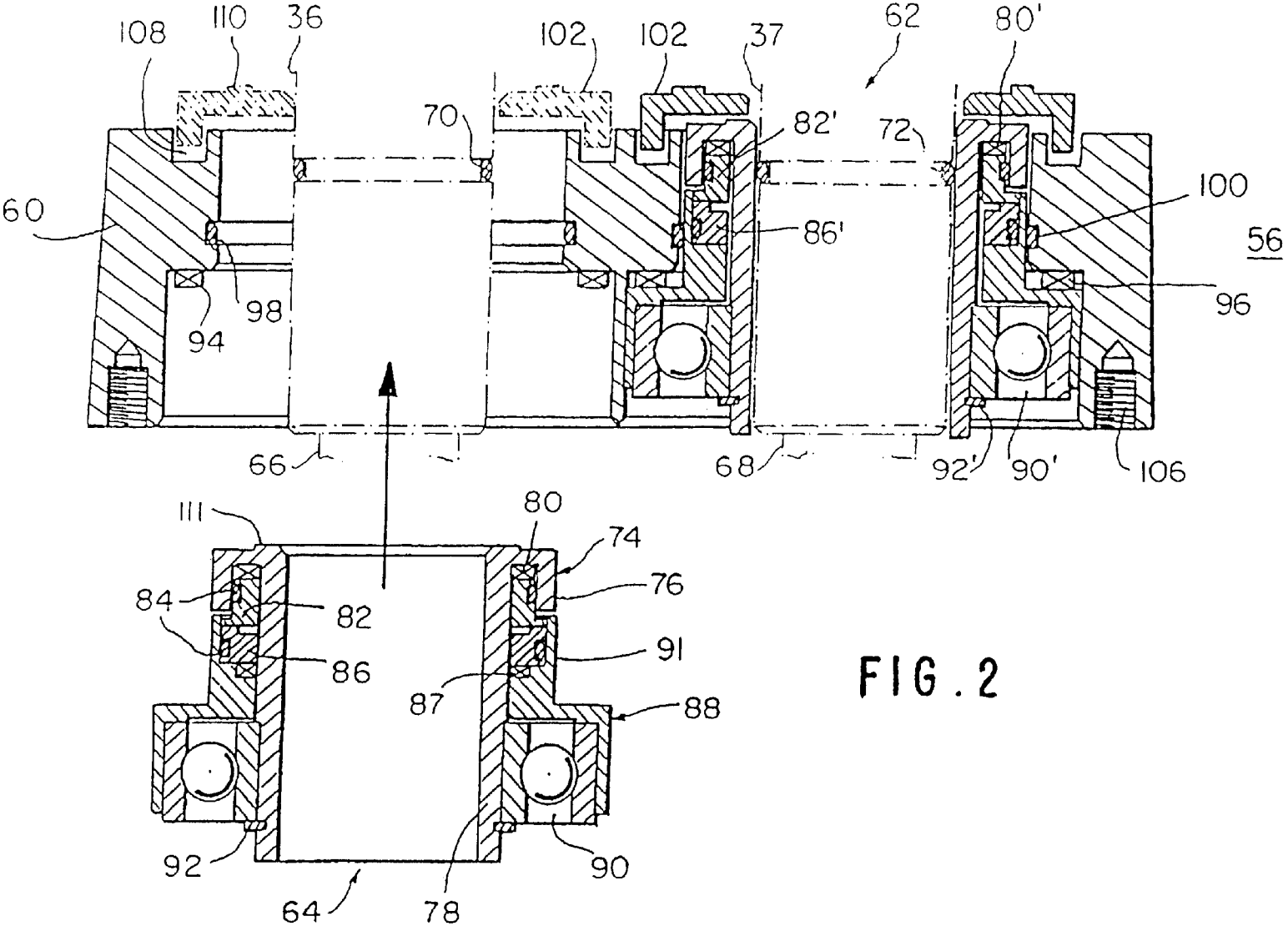
FIG. 2 is a schematic view illustrating the seal cartridges and their assembly to form a dual seal cartridge in the first preferred embodiment.

As illustrated in FIG. 1, the cutter stack 16 is supported top and bottom by means of a pair of bearing seal assemblies 54, 56. FIG. 2 illustrates in greater detail those two subassemblies, although only one is illustrated.

Referring now to FIG. 2, the assembly 56 is explained in greater detail. It will be understood from reference to FIG. 1 that the assembly on top 54 is the same as the assembly on the bottom 56, the unit simply being inverted. FIG. 2 illustrates the seal bearing assembly 56. The units are assembled into respective end housings, 58 and 60. FIG. 2 illustrates the end housing 60. As illustrated two identical bearing-seal cartridges are employed in the end housing. FIG. 2 illustrates one seal assembly 62 in place with a second seal assembly 64 inserted into the end housing 60.

Illustrated in phantom line in FIG. 2 are the ends 66, 68 of the shafts 36 and 37 for the respective cutter assemblies 44 and 46. It will be understood that the shaft ends 66 and 68 protrude through the respective seal cartridges but are held in place by end nuts 69. Stack tightness is achieved by tightening the end nuts 69. Access is via the cut-outs 4 so that an individual stack may be tightened. O-rings 70, and 72 are employed to provide a fluid tight seal for each shaft.

As illustrated in FIG. 2, the bearing-seal cartridge comprises a cartridge housing 74 with an outer flange 76 and an inner tubular portion 78. A spring 80 is inserted between the flange portion 76 and the cylindrical portion 78. A dynamic race 82 sealed by means of an O-ring 84. The dynamic race 82 is placed between the spring 80 and the cylindrical portion 78. This spring provides a means by which the race 82 is provided with float.

A static race 86 with an O-ring forms the race structure. The race is held in place by means of the bearing cartridge 88 having a flange element 91 to cage the static race into position and to also limit axial travel of the dynamic race. The dynamic race 82 has a face in contact with a confronting face of static race 86. A bearing structure 90 is housed inside the bearing cartridge and is held in place by means of a retaining ring, such as a snap ring illustrated as element 92. A second spring 87 may optionally be used to allow the races 82 and 86 to axially float. The advantage is prevention of potential skew of the faces of the races relative to each other.

As illustrated in FIG. 2, the second seal cartridge 54 has an identical construction of its elements. The units are held in place and are biased by means of springs 94, 96. Those springs provide float for the bearing-seal cartridges 62, 64.

Sealing occurs by means of O-rings 98, 100. It will be appreciated that with respect to the seal cartridge illustrated in its installed position on the right hand side of FIG. 2 the same elements are present. They have been denoted with prime numbers to connote the same numbering sequence. While not illustrated, it is apparent from FIG. 1 that the upper end housing, inverted having a pair of identical seal cartridges is employed. The upper end seal-bearing module may be provided with an upper spacer 103. This spacer rests on the outer race to preload the top bearing stack as the housing 42 is mounted on the housing 58 via bolts 104.

Importantly, in accordance with the first preferred embodiment of this invention the labyrinth illustrated by dotted lines with numeral 102 is not a part of the seal assembly. Rather, the labyrinth is considered to be a part of the stack assembly and is separated from the seal cartridge assembly itself. The labyrinth 102 protrudes to the influent/stream where it is subjected to particles and the like while the device is in operation. Hence, it is a component that wears and must, from time to time be replaced. In accordance with this invention, the labyrinth 102 can be replaced as a single component since it is merely placed into the annular groove 108 of the housing 60. It is compressed into position by a force applied through annular raised surface 110 that loads the labyrinth on surface 111, causes it to slightly deflect. This deflection serves to compensate for wear in the cutter stack.

As is apparent from FIGS. 1 and 2, this first preferred embodiment offers a number of important advantages. First, given the fact that the bearing-seal assemblies are a modular cartridge assembly, repair of a seal assembly requires only that a preassembled cartridge 64 be installed in place of the defective unit. Thus, the seal components and the bearing elements are combined into a single cartridge assembly 64. This allows for important advantages over the prior art in that the individual components do not have to be disassembled at a job site.

Secondly, by this invention stack tightening occurs independent of compression forces on the seal components. This occurs because, in accordance with this invention, the cartridges themselves are positioned and loaded independent of the cutter stack. That is the housing 58 is attached to gear housing 42 by means of the bolts 104. Tightening the cutter stacks by means of the nuts 69 does not increase the forces on the bearings or seals. Rather, the force is a function of the spring force of the spring 80.

In the case of the upper assembly axial positioning is obtained by the spacer 103 which opposed by spring 94 as the unit is bolted by means of bolts 104. The bottom assembly is allowed to float. The bottom assembly is mounted by means the mounting bolts 106, without the use of a spacer. It is understood that the cover plates and mounting structure of the housing 1 have been eliminated.

This invention also includes a provision of leak detection by means of a leak detection plug 108. Thus, an upper seal failure can be ascertained by fluid in the upper housing via the leak detection plug 108. If there is any water in the area, it will alert personnel that there is a potential failure in the upper bearing seal. Additionally, a leakage path can be provided in each of the shafts 36, 37. To the extent that fluid permeates the seal it will thus escape to the exterior where it can be viewed during routine maintenance checks.

As set forth herein, in accordance with this invention a cartridge type bearing-seal 64 allows for replacement of units on an individual basis as opposed to replacement of the entire seal pair at the top or bottom of the cutter stack. Additionally, the entire assembly with the bearings intact can be removed from the housing for servicing. Given the construction of those cartridge elements tightening of the cutter stack can be accomplished without impairing the effectiveness of the seal. That is, compression of the seal components themselves occurs during the assembly of each of the seal cartridge units illustrated in FIG. 2. Thus, the integrity of those units is accomplished independent of the tightness of the cutter stack.

Moreover, as illustrated in FIGS. 1 and 2 the labyrinth 102 is placed between the main fluid chamber and either of the seal faces. In this invention the labyrinth 102 is distinct and separate from each of the seal cartridges. To the extent that the labyrinth requires replacement, it can be done by removing the cartridge, inserting a new labyrinth and then reinstallation of the cartridge 56 without any disassembly of the seal components.

Figure 3:
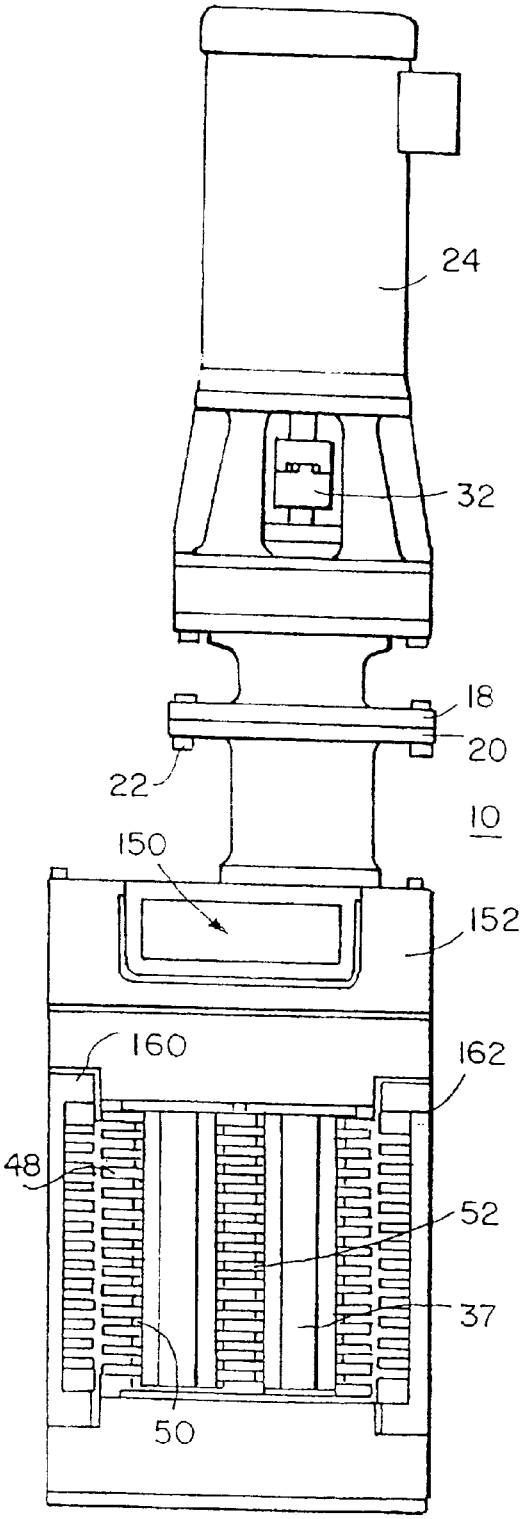
Figure 5:
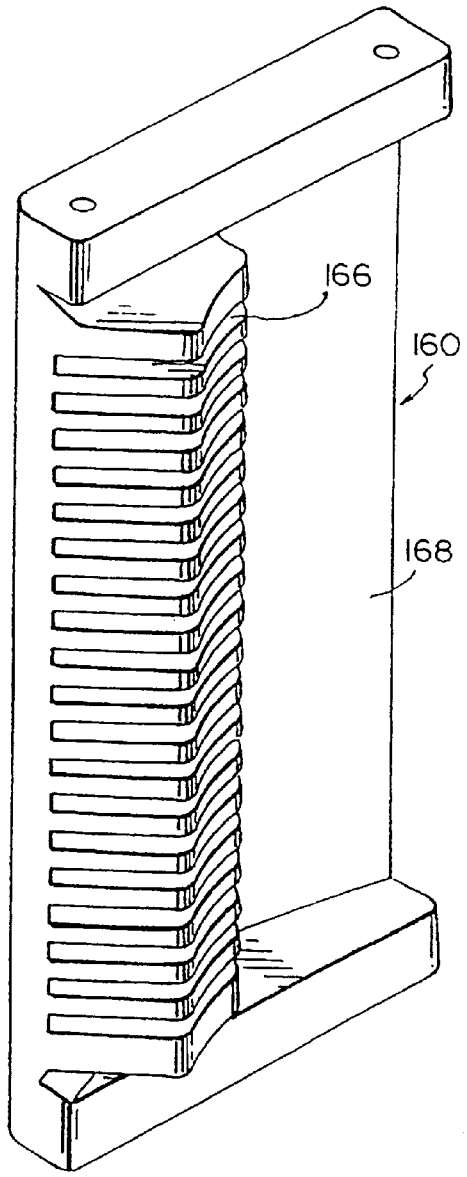
Figure 4:
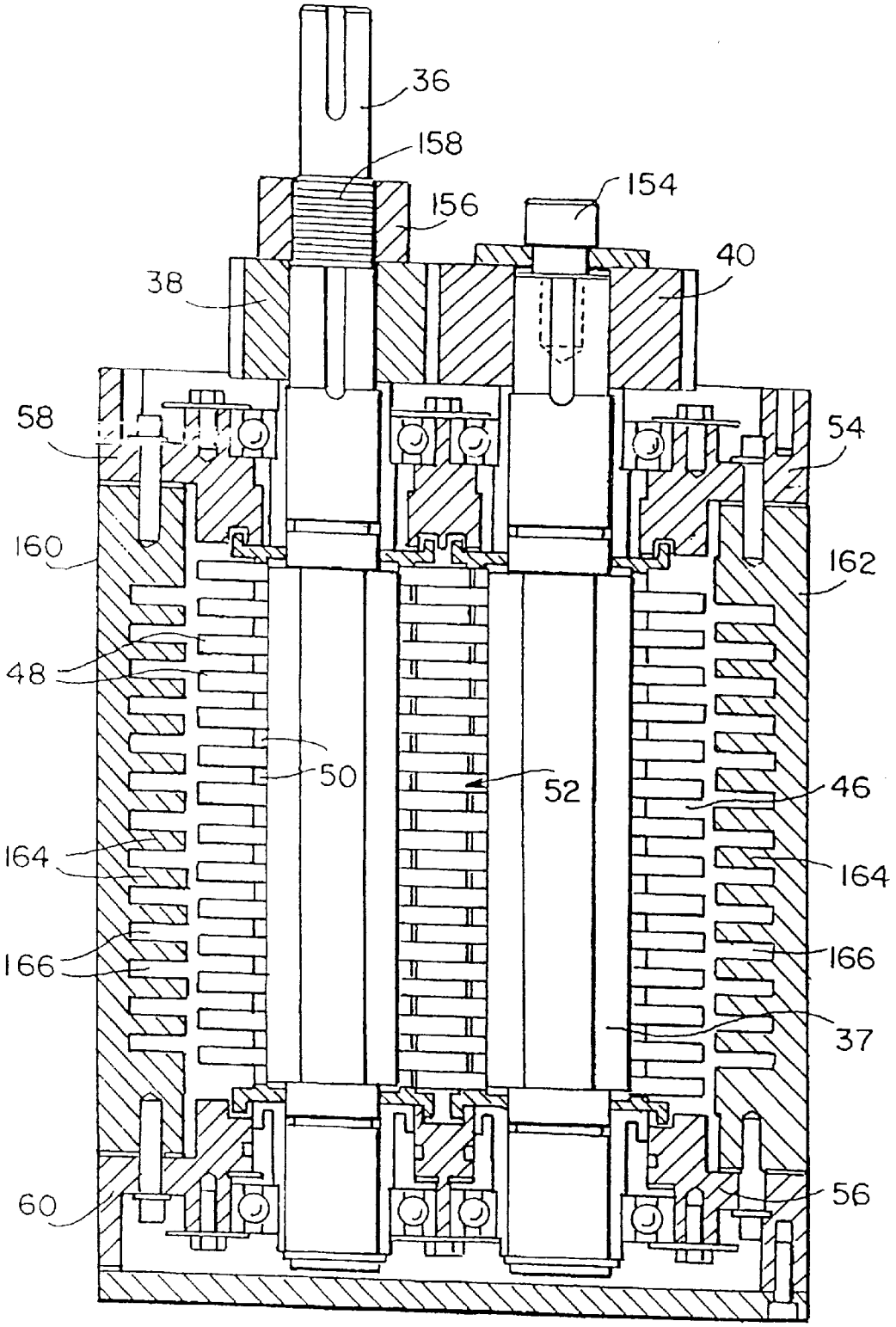

Referring now to FIGS. 3, 4 and 5, a second preferred embodiment of this invention is illustrated. This second preferred embodiment differs from the first in that the stack access port is located at the top of the cutter stack and additionally, a side rail system is employed to promote flow around the cutter stacks. To the extent that elements common to the first preferred embodiment are employed, such use common numerals and the description thereof will not be repeated.

As illustrated in FIG. 3, this preferred embodiment employs an access port 150 positioned at the top of the head stack assembly. This port is used to gain access to the nut and bolt for tightening the stack. An advantage of moving the head tightening access to the top of the unit is that the lower housing may be reduced in profile allowing more of the cutting chamber to be submerged and active, thus reducing upstream head drop. It will be appreciated that a reduction in upstream head is significant because it reduces the possibility of flooding or backup in the channel. Another advantage is that the device can be directly serviced from the top, if necessary by removal of the top cover 152.

As illustrated in FIGS. 3 and 4, when the access port 150 is opened, direct exposure of the stack tightening bolt 154 and nut 156 occurs. Stack screw 154 bears on the stack having gear 40 and is tightened directly into that gear by internal threads. It will be understood that the tightening action of this screw compresses the head stack by a compressive force applied to the cutter stack 48,50 via the housing 54 for the upper bearing assembly assembly. Tightening of the other stack assembly, which is in line with the motor drive shaft 36 is by nut 156 which tightens on threads 158 cut into shaft 36.

As illustrated in FIGS. 4 and 5, the device employs a pair of side rails 160 and 162. The side rails extend from the top of the unit where they are joined to top housing members 54 and 58 respectively and at the bottom where they are joined to the bottom housing members 56 and 60 respectively. As can be a appreciated from these figures, the side rails have an appreciable gauge and rigidity from the rails and thus serve to strengthen the device by stiffening it. This provides the advantage of allowing the seal bearing assemblies to float.

Each of the side rails has a portion with projections 164 with recesses or slots 166 formed herebetween. As illustrated in FIG. 4 these projections and recesses are offset with respect to the elements of the cutter stack assemblies. They may be slightly offset, as illustrated. As a result flow channels are created at the upstream, input side of the device to direct solids into the cutter elements. This occurs due to the angular orientation of the front of the side rails which initially directs flow toward the cutters. The slots however permit water flow through the rails and accelerate the flow rate due to the decrease in sectional area around the cutters.

Referring now to FIG. 5 the details of the side rail are illustrated. Such devices are known per se, for example as described in commonly assigned U.S. Pat. No. 4,702,422. The configuration here departs from that in the use of a significant open area 168 on the downstream side of the device. It has been found that this configuration allows for greater acceleration of fluid around the outside of the cutter elements, thus cleaning them while at the same time carrying out the primary function of diverting solids at the input side toward the cutter stack.

Figure 6:
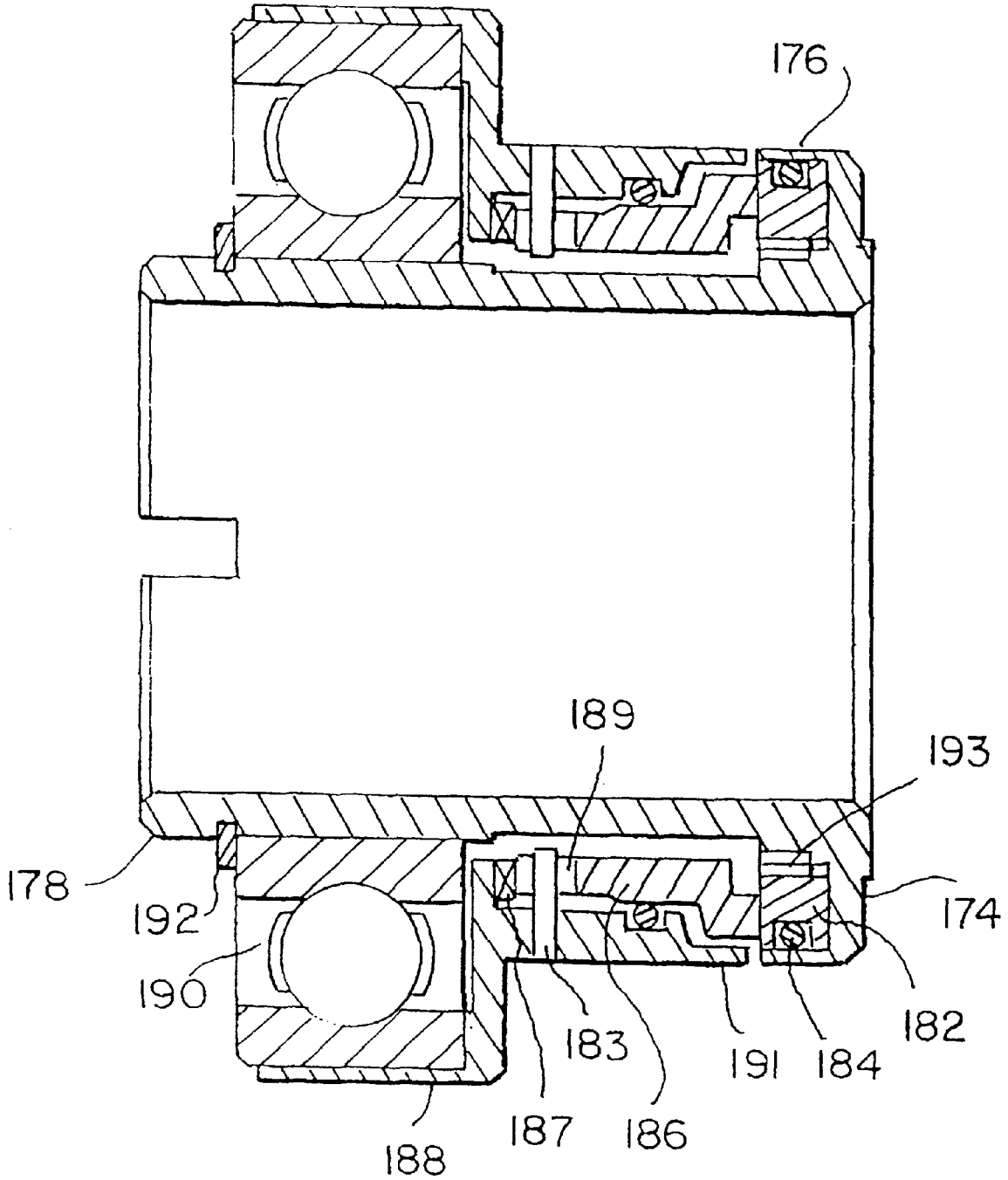
FIG. 6 is an embodiment of an alternative seal-bearing assembly.

While FIG. 5 illustrated the left hand side rail, it will be appreciated the the right hand one 162 will be of the same configuration. FIG. 6 illustrates in sectional view an alternative seal assembly. In this embodiment a single assembly is described, it being understood that this assembly will be employed in a manner identical to that of the first preferred embodiment. The units are assembled into respective end housings. As illustrated in FIG. 6, the bearing-seal cartridge comprises a cartridge housing 174 with an outer flange 176 and an inner tubular portion 178. A dynamic race 182 sealed by means of an O-ring 184 which is placed between the flange 176 and a recess in the dynamic race 182.

A static race 186 has a contact surface with the dynamic race and is biased into contact by the wave spring 187. The static race is held in place by means of the bearing cartridge 188 having a flange element 191 to cage the static race into position. The dynamic race 182 has a face in contact with a confronting face of static race 186. The dynamic race is positioned by means of lugs 193. The static race is positioned by lugs 189 and pins 183.

A bearing structure 190 is housed inside the bearing cartridge and is held in place by means of a retaining ring, such as a snap ring illustrated as element 192. In this embodiment the wave spring on the back side is eliminated. As a result, the rotating seal face is fixed in the axial direction. The anti-rotation lugs on the inner diameter prevent rotation with respect to the seal cartridge 178/174/176. The position of the wave spring 187 together with the elongated axial extension 191 of the bearing cartridge 188 support axial movement thereof and properly load the static seal face. The O-ring 184 for the static race in this embodiment is positioned in a recess in the housing as opposed to one in the race as in the first embodiment.

In the embodiment of FIG. 6 the anti-rotation mechanism for the static race 186 is achieved by radial slots located adjacent to the wave spring. The pins 183 are then pressed through the bearing cartridge 188 and engage the radial slots of the static race 186. Also, as illustrated in FIG. 6, the seal face geometry is modified from that of FIG. 1 to allow flexibility in seal balance ratios.

It will be apparent to those of skill in this technology that modifications of this invention can be made without departing from the essential scope thereof.

We claim:

1. Apparatus for comminuting solid waste material comprising:

drive means for providing rotary motion, a pair of cutter stacks with cutter elements of one stack interleaved with cutter elements of the other, and gear means to transmit the rotary motion of said drive means into counter-rotation of cutter elements of one stack with cutter elements of the other, each of said cutter stacks comprising a central shaft journaled for rotation proximate each end, means to tighten each of said cutter stacks positioned on said stacks proximate to said gear means, and an access port providing direct access to said means to tighten without disassembly of any portion of said drive means.

2. The apparatus of claim 1 further comprising:

a seal-bearing assembly at each end comprising an end housing, a pair of insertable pre-assembled bearing elements mountable in each of said end housings, one bearing element having a thru-hole for journaling a first shaft for rotation and a second bearing element having a thru-hole for journaling a second shaft for rotation and a seal for each of said first and second bearing elements to provide fluid isolation between said end housing.

3. The apparatus of claim 2 further comprising a labyrinth positioned on top of both bearing elements, said labyrinth insertable onto said end housing and having a flange conforming in shape to a portion of each end assembly proximate to said cutter stacks.

4. The apparatus of claim [1] *2*, wherein each of said preassembled bearing elements comprises a seal cartridge, a spring mounted on the seal cartridge, a dynamic race biased by said spring, a bearing cartridge, a static race mounted on said bearing cartridge, a bearing mounted in said bearing cartridge and means to secure said bearing in said bearing element and to urge said static race into contact with said dynamic race.

5. The apparatus of claim 3 further comprising seal means to fluid isolate said bearing from said static race.

6. The apparatus of claim 4 further comprising spring means to bias said bearing cartridge in said end housing.

7. The apparatus of claim 4, further a spring to bias said static race and provide axial float for said static and dynamic races.

8. The apparatus of claim 1 further comprising a side rail positioned on sides of comminutor adjacent to said cutter stacks to direct and accelerate fluid flow around said cutter elements while directing entrained solids in said flow toward said cutter stack.

9. The apparatus of claim 8, wherein each of said side rails comprise a series of generally parallel horizontal grooves and projections juxtaposed with an adjacent cutter stack at an upstream side of said comminutor and having a smooth surface at a downstream side to reduce surface friction.

10. The apparatus of claim 8 wherein each of said side rails extends from the top of said cutter stack to the bottom of the cutter stack to stiffen said comminutor.

11. The apparatus of claim 1 further comprising a labyrinth mountable on an end housing and protruding in part into an enfluent stream, said labyrinth having a bearing surface that causes said labyrinth to elastically deform and compensate for variations in cutter stack height.

12. The apparatus of claim 1 further comprising a side rail positioned adjacent each of said cutter stacks, said side rails having a slotted upstream side to divert solids into said cutter stacks and smooth downstream side to accelerate the flow of water away from said cutter stacks.

13. The apparatus of claim 1 further comprising a seal-*bearing assembly* disposed on each central shaft to isolate ends of said shafts[, each of an end seals positioned in said housing].

14. A solid waste material comminuting system comprising:

an electric motor for providing rotary motion, a pair of cutter stacks with cutter elements of one stack interleaved with cutter elements of the other, and gear means to transmit the rotary motion of said electric motor to counter-rotate cutter elements of one stack with cutter elements of the other, each of said cutter stacks comprising a central shaft journaled for rotation, a seal-bearing module at each end of the central shafts, each seal-bearing module comprising an end housing, and a pair of insertable preassembled bearing assemblies mountable in each of said end housings, one bearing assembly having a thru-hole for journaling a first shaft for rotation and [a second] *another* bearing assembly having a thru-hole for journaling a second shaft for rotation and a seal for each of said bearing assemblies to isolate [it] *the bearing assemblies* from said end housing and, a side rail positioned outside of each cutter element to divert solids into said cutter elements at an upstream side.

15. The [apparatus] *system* of claim 14, wherein each of said pre-assembled bearing assemblies comprises a seal cartridge, a spring mounted on the seal cartridge, a dynamic race biased by said spring, a bearing cartridge, a static race mounted on said bearing cartridge, a bearing mounted in said bearing cartridge and means to secure said bearing in said bearing assembly.

16. The [apparatus] *system* of claim 15 further comprising seal means to fluid isolate said bearing from said static race.

17. The [apparatus] *system* of claim 15 further comprising spring means to bias said bearing cartridge in said end housing.

18. The [apparatus] *system* of claim 14 further comprising a labyrinth positioned on top of both bearing assemblies to provide a wear interface between said bearing assemblies and an enfluent flow, said labyrinth conforming to a portion of each end housing to provide a removable mounting surface.

19. The [apparatus] *system* of claim 14 further comprising a top housing having an inspection port relative to said gear means for tightening each of said stacks.

20. The [apparatus] *system* of claim 14, further comprising a spring to bias said static race and provide axial float for said static and dynamic races.

21. The [apparatus] *system* of claim 14 further comprising seal means carried by each of said shafts and positioned in each of said thru-holes to provide fluid isolation for the ends of each of said shafts.

22. The [apparatus] *system* of claim 14 wherein each side rail has a first portion [interleaved] *juxtaposed* with an adjacent cutter stack and a second portion downstream of the first portion to accelerate flow around said cutter stack.

*23. Apparatus for comminuting solid waste material comprising:*

*drive means for providing rotary motion, a pair of cutter stacks with cutter elements of one stack interleaved with cutter elements of the other, and gear means to transmit the rotary motion of said drive means into counter-rotation of cutter elements of one stack with cutter elements of the other, each of said cutter stacks comprising a central shaft journaled for rotation proximate each end; and*

*at least one side rail adjacent a cutter stack to direct fluid flow around said cutter elements of said stack while directing entrained solids in the flow toward said cutter stack, wherein*

*said side rail comprising a series of generally parallel horizontal grooves and projections juxtaposed with the adjacent cutter stack at an upstream side of the comminuting apparatus and having a smooth surface at a downstream side to reduce surface friction.*

*24. The apparatus of claim 23, comprising side rails adjacent to each of said cutter stacks, said side rails each comprising a series of generally parallel horizontal grooves and projections juxtaposed with the adjacent cutter stacks at an upstream side of the comminuting apparatus and having a smooth surface at a downstream side to reduce surface friction.*

*25. The apparatus of claim 23, further comprising:*

*means to tighten each of said cutter stacks positioned on said stacks proximate said gear means; and*

*an access port providing direct access to said means to tighten without disassembly of any portion of said drive means.*

*26. The apparatus of claim 23, further comprising:*

*a seal-bearing module at each end of the central shafts, each seal-bearing module comprising an end housing, and a pair of insertable preassembled bearing assemblies mountable in each of said end housing, one bearing assembly having a thru-hole for journaling a first shaft for rotation and another bearing assembly having a thru-hole for journaling a second shaft for rotation and a seal for each of said bearing assemblies to isolate the bearing assemblies from said end housing.*

*27. A solid waste material comminuting system comprising:*

*a motor for providing rotary motion, a pair of cutter stacks with cutter elements of one stack interleaved with cutter elements of the other, and a gear to transmit the rotary motion of said motor to counter-rotate cutter elements of one stack with cutter elements of the other, each of said cutter stacks comprising a central shaft journaled for rotation; and*

*a side rail positioned outside of the cutter elements of one of said stacks to divert solids into said cutter elements at an upstream side, wherein*

*said side rail has a first portion juxtaposed with the stack and a second portion downstream of the first portion to direct flow around the stack.*

*28. The system of claim 27, comprising side rails positioned outside of the cutter elements of both stacks to divert solids into the cutter elements at an upstream side, said side rails each having a first portion juxtaposed with the stacks and a second portion downstream of the first portion to direct flow around the stacks.*

*29. The system of claim 27, further comprising:*

*means to tighten both cutter stacks positioned on the stacks proximate said gear; and*

*an access port providing direct access to said means to tighten without disassembly of any portion of said motor.*

*30. The system of claim 27, further comprising:*

*a seal-bearing module at each end of the central shafts, each seal-bearing module comprising an end housing, and a pair of insertable preassembled bearing assemblies mountable in each of said end housings, one bearing assembly having a thru-hole for journaling a first shaft for rotation and another bearing assembly having a thru-hole for journaling a second shaft for rotation and a seal for each of said bearing assemblies to isolate the bearing assemblies from said end housing.*

* * * * *